No. 884,688. PATENTED APR. 14, 1908.
W. H. TERRY.
CULINARY DEVICE.
APPLICATION FILED MAR. 8, 1907.
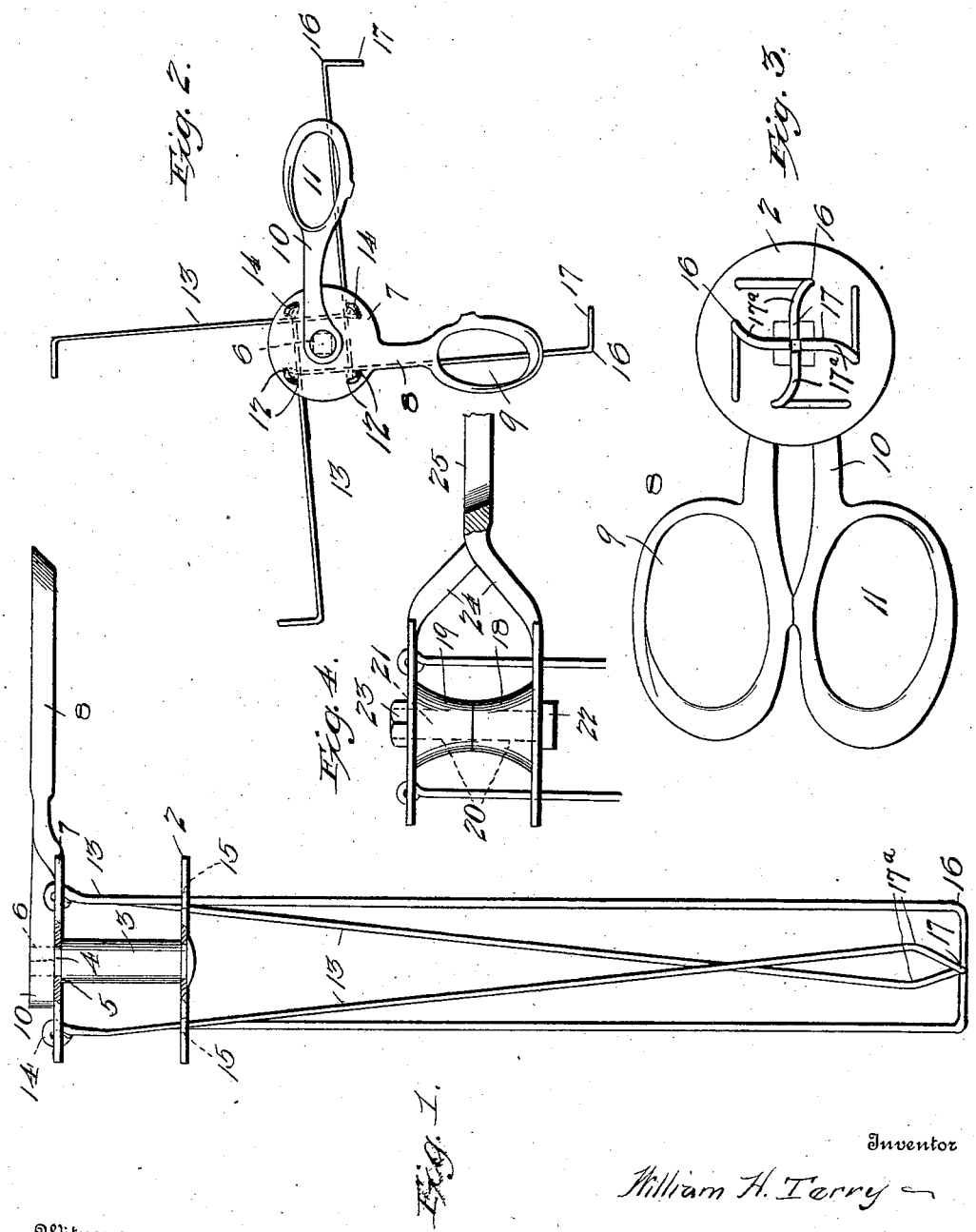
Witnesses
Inventor
William H. Terry
By Geo. S. Vashon
Attorney

UNITED STATES PATENT OFFICE.

WILLIAM H. TERRY, OF FALL RIVER, MASSACHUSETTS.

CULINARY DEVICE.

No. 884,688.  Specification of Letters Patent.  Patented April 14, 1908.

Application filed March 8, 1907. Serial No. 361,231.

*To all whom it may concern:*

Be it known that I, WILLIAM H. TERRY, a citizen of the United States, residing at Fall River, in the county of Bristol and State of Massachusetts, have invented new and useful Improvements in Culinary Devices, of which the following is a specification.

The invention relates to a culinary device and more particularly to the class of lifter tongs for lifting and transferring various articles.

The primary object of the invention is the provision of a device having separated disk elements and gripping arms carried by one of the said disk elements and guided by the other disk element, one of said disk elements being rotative with respect to the companion disk element to open and close the arms for engagement with an article for lifting and transferring the same from one place to another.

A further object of the invention is the provision of a device for lifting plates or other articles from an oven or steamer.

Other objects of the invention are the provision of a device for lifting and transferring articles which is simple, durable, efficient in operation and inexpensive in the manufacture.

With these and other objects in view, the invention, for example, consists in the construction, combination and arrangement of parts, as will be hereinafter referred to and as illustrated in the accompanying drawings, which disclose the preferred embodiment of the invention, however, it is to be understood that changes, variations, and modifications may be made as will come properly within the scope of the claims hereunto appended.

In the drawings, Figure 1 is a side view of the culinary device. Fig. 2 is a top view of the same with the arms spread apart. Fig. 3 is a bottom view with the arms in a closed position. Fig. 4 is a modification of the culinary device.

Similar reference characters indicate corresponding parts throughout the several views.

The numeral 2 designates a disk element having a tubular stem 3 extending upwardly at a central point therefrom and the same provided with a reduced portion 4 forming a shoulder as 5. Said reduced portion 4 terminates in a squared end 6. Rotatably mounted on the reduced portion 4 and having bearing on the shoulder 5 is a rotatable disk element 7. Said disk element 7 is provided with a laterally extending handle member 8 terminating in a thumb opening 9. Mounted on the squared end is a handle member 10 terminating in a finger opening 11. The said disk element 7 is provided with a plurality of pairs of openings 12 circumferentially thereof. Extending through one opening of each pair of openings 12 is a yieldable arm 13, one end thereof being bent on itself and passing through the remaining opening of each pair of openings 12 to form a loop 14 for flexible engagement of the arms 13 with said disk element 7.

The disk element 2 is provided with a plurality of guide openings 15 normally in alinement with one opening of each pair of openings 12 in the disk element 7 through which the yieldable arms pass. The opposite ends of the yieldable arms 13 are bent as at 16 to form hook extremities 17 for engagement with articles to be supported and transferred by the device, and adjacent to the hooks, the arms are formed with curved offsets $17^a$ which will permit them to clear the crust of a pie at its edges when handling such articles.

The operation of the device is performed by the operator gripping the handle members 8 and 10, respectively and by spreading the same from each other will cause the disk elements 2 and 7, respectively, to rotate in opposite directions and by this movement thus causes the yieldable arms 13 to spread from each other and by a desirable movement of the handle members will cause the arms to adjust themselves so as to engage an article by the hook extremities 17 contacting with said article so that the latter can be lifted and transferred to any desirable position.

When it is desired to release the article from engagement with the hook extremities 17 the operator actuates the handle members 8 and 10, respectively, so as to cause the opposite rotation of the disk elements 2 and 7, respectively, which latter will cause the spreading of the yieldable arms 13, thereby releasing the said hook extremities 17 from engagement with the article.

In Fig. 4 is shown a modification, the disk elements 2 and 7, respectively being integral with cylindrical stems 18 and 19, the ends of which abut and rotate upon each other and centrally through the same are bores 20 in which is mounted a spindle 21 having a headed end 22 and a detachable nut 23 for rotatably connecting said disk elements 2 and 7 respectively. Extending laterally from each disk element 2 and 7 is an arm 24 terminating in finger openings 25 for actuating the disk elements.

What I claim is:

1. A pair of separated disk elements, and gripping arms carried by one of the disk elements and guided by the other disk elements, one of said disk elements being rotative with respect to the companion disk element to open and close the arms.

2. A device of the class described, including oppositely rotatable disks, pivotally connected with and spaced a distance from each other, handle members rigidly associated with each of the disks and extending laterally therefrom, a plurality of arms flexibly connected to one of the disks and slidably connected with the remaining disk, and each having a bent terminal at the free end forming a hook and adjacent thereto a curved offset.

3. A device of the class described including a disk having an upwardly extending stem, the latter provided with a reduced portion terminating in a squared end, a rotatable disk mounted on the reduced portion, handle members connected with the rotatable disk and with the squared end of the stem, and yieldable members flexibly connected to the rotatable disk and in slidable engagement with the remaining disk, said members having bent terminals forming hooks.

4. A device of the class described comprising a disk having a handle, a plurality of arms flexibly connected with said disk and terminating in hook extremities, a member mounted to rotate with respect to said disk, and connections between said member and said arms whereby the arms are closed together or opened out as the disk is rotated in one direction or the other.

In testimony whereof, I affix my signature in presence of two witnesses.

WILLIAM H. TERRY.

Witnesses:
NELSON S. FREELOVE,
DANIEL A. FOLEY.